United States Patent
Melancon (10) Patent No.: US 11,873,168 B2
(45) Date of Patent: Jan. 16, 2024

(54) REAL-TIME HANGER ORIENTATION DETECTION FOR A RAIL-BASED GARMENT CONVEYOR

(71) Applicant: ThredUp Inc., San Francisco, CA (US)

(72) Inventor: Jimmy Melancon, Hoschton, GA (US)

(73) Assignee: THREDUP INC., San Francisco, CA (US)

( * ) Notice: Subject to any disclaimer, the term of this patent is extended or adjusted under 35 U.S.C. 154(b) by 256 days.

(21) Appl. No.: 17/519,959

(22) Filed: Nov. 5, 2021

(65) Prior Publication Data

US 2023/0142043 A1    May 11, 2023

(51) Int. Cl.
| | | |
|---|---|---|
| *A47G 25/14* | (2006.01) | |
| *B65G 43/08* | (2006.01) | |
| *B65G 35/06* | (2006.01) | |
| *A47G 25/44* | (2006.01) | |

(52) U.S. Cl.
CPC ............ *B65G 43/08* (2013.01); *A47G 25/14* (2013.01); *A47G 25/44* (2013.01); *A47G 25/447* (2013.01); *B65G 35/06* (2013.01); *B65G 2201/0229* (2013.01); *B65G 2203/0233* (2013.01); *B65G 2203/042* (2013.01)

(58) Field of Classification Search
CPC ........ A47G 25/02; A47G 25/04; A47G 25/14; A47G 25/44; A47G 25/447; B65G 2201/0229; B65G 2203/0225
See application file for complete search history.

(56) References Cited

U.S. PATENT DOCUMENTS

| | | | |
|---|---|---|---|
| 10,450,139 B2 | 10/2019 | Friedl et al. | |
| 2023/0112686 A1* | 4/2023 | Johansson | ............... D06F 95/00 223/85 |

* cited by examiner

*Primary Examiner* — Benyam Haile
(74) *Attorney, Agent, or Firm* — FENWICK & WEST LLP (57) ABSTRACT

A hanger orientation detection system determines the orientation of a hanger on a rail-based garment conveyor. To do so, the detection system continuously monitors the pivot state of a pivot arm. The pivot arm pivots between no-contact and contact pivot states. The no-contact pivot occurs when a garment hanger in a correct orientation translates past the pivot arm without contacting the pivot arm. The contact pivot state occurs when a garment hanger in an incorrect orientation translates past the pivot arm and contacts the pivot arm. Contacting the pivot arm displaces the pivot arm in a measurable manner. The sensor measures the deflection of the pivot arm to determine the pivot state. When the sensor senses that the pivot state changes from the no-contact pivot state to the contact pivot state, the detection system generates an alert signal indicating that a garment hanger is in the incorrect orientation.

21 Claims, 9 Drawing Sheets

REAL-TIME HANGER ORIENTATION DETECTION FOR A RAIL-BASED GARMENT CONVEYOR

BACKGROUND OF THE INVENTION

This disclosure relates generally to an orientation detection system, and more specifically to determining an orientation of a hanger on a rail-based garment conveyor with the orientation detection system.

Traditionally, retailers have maintained a limited population of items at a store-front or storage facility for order fulfillment. However, modern technology has increased the ability of retailers to maintain an increasing number of items in the population that are available to customers for order fulfillment. With the increase of the number of items in the population, systems for efficient automated processing of that population have introduced a variety of complex challenges.

For example, due to the throughput of rail-based garment conveyors in modern autonomous garment intake systems being very high, any technical fault caused by a garment hanger being attached to the rail-based system in an incorrect orientation can be highly detrimental to system efficiency. To illustrate, a garment hanger in an incorrect orientation has the potential to derail and/or clog the rail-based system such that a large number of trailing garment hangers also further derail and/or clog the rail-based system. Remedying this technical fault is time consuming and greatly decreases the efficiency of the system. Described herein is an orientation detection system that allows for determining whether a garment hanger is in an incorrect orientation before the garment hanger can cause a technical fault. By diagnosing whether a garment hanger is in an incorrect orientation, the orientation detection system is able to prevent technical faults that decrease system efficiency.

SUMMARY OF THE INVENTION

A hanger orientation detection system is configured to detect the orientation of a hanger on a rail-based garment conveyor. The hanger orientation detection system includes an attachment member the couples the hanger orientation detection system to the rail of a garment conveyor. A pivot arm is coupled to the attachment member. The pivot arm is pivotable between a no-contact pivot state and a contact pivot state. The orientation detection system is in a no-contact pivot state when a garment hanger in a correct orientation on the rail of the garment conveyor translates past the pivot arm without contacting the pivot arm. Conversely, the orientation detection system is in a contact pivot state when a garment hanger in an incorrect orientation on the rail of the garment conveyor translates past the pivot arm and contacts the pivot arm. Contacting the pivot arm displaces the pivot arm in a measurably manner.

A sensor is continuously monitoring the pivot state of the pivot arm. The sensor measures the deflection of the pivot arm to determine the pivot state. When the sensor senses that the pivot state changes from the no-contact pivot state to the contact pivot state (by deflecting), a notification system electrically coupled to the sensor generates an alert signal. The alert signal indicates the change in pivot state, and correspondingly indicates that a hanger is in the incorrect orientation on the rail-based garment conveyor. The notification system may also transmit a notification (i.e., based on the alert signal) to the garment conveyor when the sensor determines a hanger is in the incorrect position. The notification may cause the garment conveyor to stop translating the garment hanger in order to prevent the technical fault.

BRIEF DESCRIPTION OF THE DRAWINGS

The invention has other advantages and features which will be more readily apparent from the following detailed description of the invention and the appended claims, when taken in conjunction with the accompanying drawings, in which:

The figures and the following description depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

I. Garment Marketplace

Figure 1:
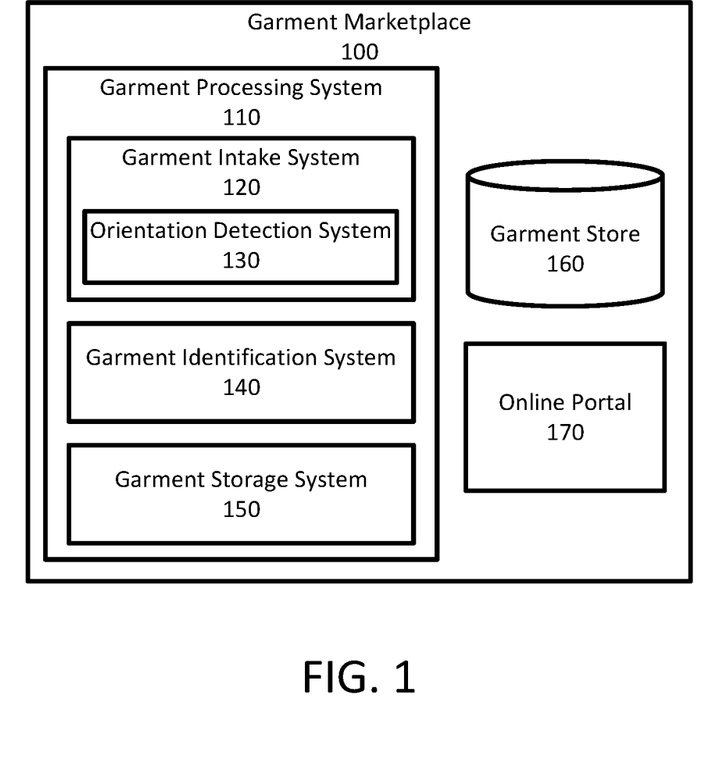
FIG. 1 is an illustration of a garment marketplace, according to one example embodiment.

FIG. 1 is an illustration of a garment marketplace, according to one example embodiment. A garment marketplace 100 includes a garment processing system 110, a garment store 160, and an online portal 170. In various other embodiments, the garment marketplace 100 can include additional or fewer systems, or the system may be combined in another manner.

Broadly, the garment marketplace 100 place allows users to buy and sell garments to one another via an online portal 170. For example, the garment marketplace 100 may allow three unique users to interact in order to purchase and sell garments. To illustrate, a first user may access the online portal 170 to send a first garment to the garment marketplace 100 for storage in a garment store 160 until it is sold via consignment on the online portal 170. A second user may access the online portal 170 to sell and send a second garment to the garment marketplace 100, which then stores the garment in the garment store 160 before resale via the online portal 170. A third user may access the online portal 170 to purchase both the first and second garments, and the garment marketplace 100 sends the third user the first and second garments. In this case, the first user would receive some portion of the proceeds for the sale of the first garment because it was offered for sale on the garment marketplace 100 via consignment.

In other words, the online portal 170 provides access to the garment marketplace 100 and enables individual users to offer garments for sale, buy garments from the garment store 160, managed consigned garments, and more generally enables the functionality of the garment marketplace 100. The online portal 170 may be a website, a phone application, or some other service that provides access to the functionality of the garment marketplace 100. In an embodiment, the online portal 170 is a website that maintains a retail page for each individual garment maintained in the garment marketplace 100. Thus, users can navigate between retail pages on the website as if they are browsing a store. The website also includes functionality that enables a user to send garments to the garment marketplace 100 for resale or consignment.

The garment store 160 stores garments in the garment marketplace 100. In an example configuration, the garment store 160 is a translatable rail system, or garment conveyor. The translatable rail system comprises item storage locations, and each garment may be stored in one or more of the item storage locations. Because the garment store is translatable, the item storage locations may be translated throughout the garment store 160 for ease of access. An example garment store is found in U.S. Pat. No. 10,450,139, which is hereby incorporated by reference in its entirety.

As part of its buying and selling process, the garment marketplace 100 processes received garments with a garment processing system 110. The garment processing system 110 includes an intake system 120, a garment identification system 140, and a garment storage system 150. In various other embodiments, the garment processing system 110 can include additional or fewer systems, or the system may be combined in another manner.

Broadly, the garment processing system 110 processes received garments for storage in the garment store 160 ("stored garment") and sale via the online portal 170. That is, users browse and buy stored garments from the garment store 160 via the online portal 170, and the garment marketplace 100 sends the purchased garments to the purchasing user.

The intake system 120 is configured to receive garments from users of the garment marketplace 100 ("intake garments") and prepare them for storage. Receiving garments can include unpackaging the garment from a parcel, unpacking the garment from a shipping crate, etc. Preparing garments for storage can include moving the garments to the garment identification system 140, or storage system (e.g., the garment store 160), as needed.

The intake system 120 includes a garment conveyor. The garment conveyor is configured to move garment hangers through the garment marketplace 100. To do so, the garment conveyor includes an actuatable rail. The rail is configured such that garment hangers are couplable to the rail. Garment hangers may be coupled to the rail by, for example, hanging the garment hanger on the rail, although other possibilities are also possible (e.g., clasps, pins, screws, etc.). Garments may be coupled to the garment hangers by, for example, hanging the garment on the garment hanger. Other examples of coupling garments to garment hangers are also possible (e.g., clasps, pins, tape, etc.).

The garment marketplace 100 actuates the rail to move garment hangers (and thereby any affixed garments) through the garment marketplace 100 along a path through the garment marketplace 100. For convenience, the path that garment hangers take through the marketplace is considered to be the space in which the garment hangers hang below the rail. In other words, the path is the volume of space through which a garment hanger travels as it moves through the garment marketplace 100. Of course, other paths are also possible depending on the configuration of the garment hanger and garment conveyor.

The intake system 120 also includes an orientation detection system 130 configured to detect the orientation of a garment hanger on the garment conveyor. To illustrate, consider an intake garment placed on a garment hanger as part of the intake process. The garment hanger can hang on a rail if the garment hanger in one of two orientations (e.g., for simplicity, leftward facing or rightward facing). In some examples, the garment processing system 110 is configured for operation using only one of the two orientations. That is, rightward facing garment hangers may move throughout the garment marketplace 100 without causing technical faults, while leftward facing garment hangers may cause technical faults when moving through the garment marketplace 100. For example, a leftward facing garment hanger may derail off of the garment conveyor when moving through the garment marketplace 100, while a rightward facing garment hanger would not derail. In other examples, a leftward facing garment hanger may not derail, but may still cause a damaging technical fault (e.g., becoming wedged into portions of the garment conveyor such that motion would stop). In other words, garment hangers in the garment marketplace 100 can have an incorrect orientation (e.g., leftward facing) or a correct orientation (e.g., rightward facing), and the orientation detection system 130 is configured to determine that orientation. The orientation detection system 130 is described in further detail below.

The garment identification system 140 is configured to identify a garment. Garment identification is a multi-faceted process that may include taking an image of the garment, accessing an image of the garment, generating a unique shop keeping unit ("SKU") for the garment, accessing or receiving characteristics of the garment (e.g., from a user), classifying the garment with a machined-learned model, querying a user to identify a garment, etc. The garment identification system 140 is described in greater detail below in regard to FIG. 2.

The garment store system 150 is configured to store garments in the garment store 160. For example, the garment storage system 150 may translate the garments to the garment store 160 along a rail system, using robotic automation, human assistance, or some combination thereof. The unique SKU assigned to each garment by the garment processing system 110 is used to track each unique garment within the garment marketplace 100. For example, the garment marketplace 100 may monitor the location of garment in the garment store 160 using its unique SKU.

Processing intake garments for the garment marketplace 100 is a difficult problem because each garment is generally unique. Thus, in the garment marketplace 100, each intake garment must be identified, catalogued, and associated with a unique SKU as it is moved through the garment marketplace 100, so that that the intake garment can be sold via the online portal 170. As the number of intake garments and garment processing speed increases, garment hangers having an incorrect orientation create a substantial risk to the intake efficiency of the garment marketplace 100. For instance, a technical fault caused by a garment hanger in an incorrect orientation can cause the garment processing system to be offline for tens of minutes while the fault is corrected. A garment orientation detection system can prevent this downtime by detecting a garment hanger in an incorrect orientation before it causes a technical fault in the garment marketplace 100 that decreases garment marketplace 100 efficiency.

II. Orientation Detection System

As described above, the orientation detection system 130 increases the processing efficiency of the intake system 120 by preventing technical faults in the garment marketplace 100 caused by garment hangers in an incorrect orientation.

Figure 2A:
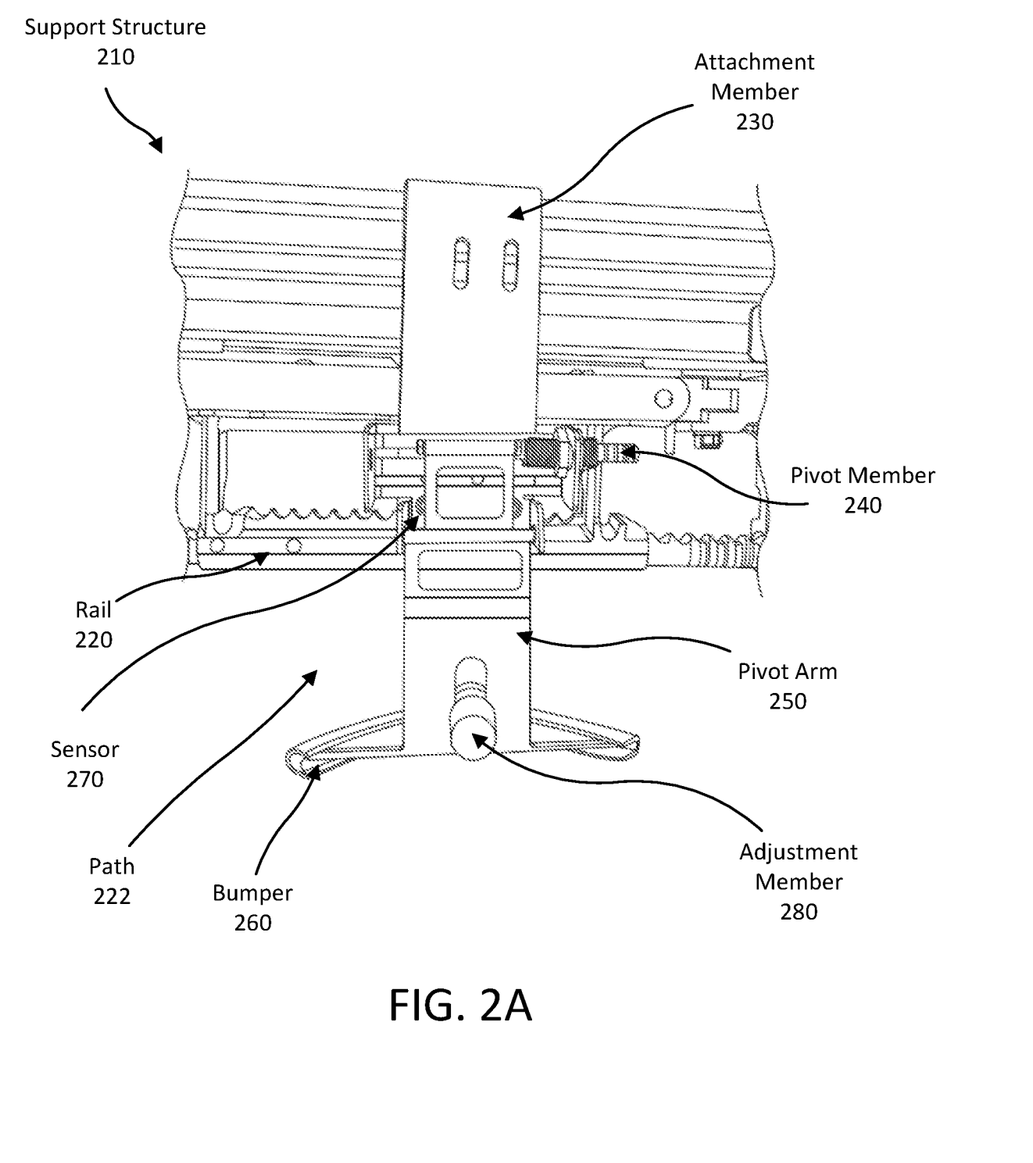
FIGS. 2A and 2B illustrate an orientation detection system on a rail-based garment conveyor, according to one example embodiment.
Figure 2B:
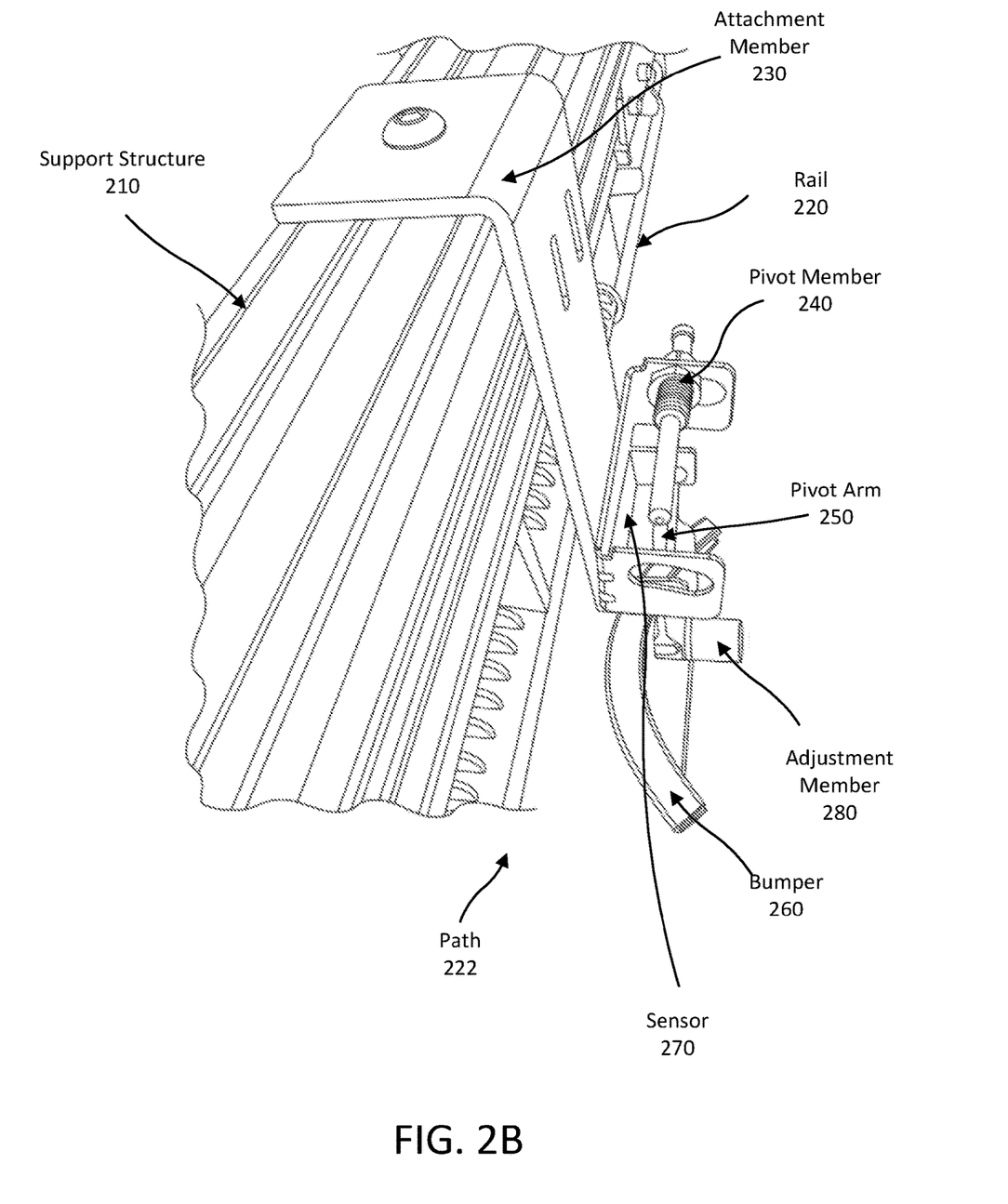

FIGS. 2A and 2B illustrate an orientation detection system on a rail-based garment conveyor, according to one example embodiment. FIG. 2A illustrates a profile view of the orientation detection system, and FIG. 2B illustrates an isometric view of the orientation detection system.

In the illustrated examples, the orientation detection system 130 is coupled to a garment conveyor. The garment conveyor is a collection of components configured to convey garments on garment hangers through the garment marketplace 100. Here, the garment conveyer includes a support structure 210 and a rail 220, but the garment conveyor may include other components not illustrated here (e.g., an actuation mechanism) or may arrange the components in a different manner.

The support structure 210 is a mechanically rigid object configured to support garments on garment hangers as they are conveyed through the garment marketplace 100 by the garment processing system 110. A rail 220 is coupled to the support structure 210 such that the support structure 210 structurally supports the rail and any garment hangers attached to the rail 220. Additionally, the rail 220 is a mechanical structure configured such that garment hangers are removably couplable to the rail 220. Garment hangers may be coupled to the rail 220 in a correct orientation or an incorrect orientation.

Moreover, when the garment conveyor actuates the rail 220 the rail moves through the garment marketplace 100. Thus, garment hangers coupled to the rail 220 also move through the garment marketplace 100 when the garment conveyor actuates the rail 220. Garment hangers coupled to the rail 220 are said to move along a path 222 through the garment marketplace 100 when the garment conveyor actuates the rail. A path 222 is represented by the volume of space through which a garment hanger travels as it moves through the garment marketplace 100. Here, for example, the path 222 is the empty space below the rail 220 (through which the garment conveyor would convey garment hangers).

The orientation detection system 130 is coupled to the garment conveyor. The orientation detection system 130 is a collection of components configured to determine an orientation of a garment hanger coupled to the rail 220 as is moves along the path 222. As illustrated, the orientation detection system 130 includes an attachment member 230, a pivot member 240, a pivot arm 250, a bumper 260, a sensor 270, and an adjustment member 280. The orientation detection system 130 may include other components not illustrated here or may arrange the components in a different manner.

The attachment member 230 is configured to removably couple the orientation detection system 130 to the support structure 210 of the garment conveyor. As illustrated, the attachment member 230 is shaped as an "L". That is, the attachment member 230 has a short leg and a long leg and has an external face (the outside face of the "L") and an internal face (the inside face of the "L"). The attachment member 230 is configured such that the internal face of the short leg is couplable to an external face of the support structure 210. As illustrated, the attachment member 230 is coupled to a top face of the support structure 210 with a bolt. Of course, the illustrated attachment member 230 is just an example, and other embodiments are also possible. For instance, the attachment member 230 may be structured with different shapes (e.g., a "U", "C", or "I"), may be coupled to the support structure 210 in different locations, and may be coupled to the support structure 210 using various techniques (e.g., screws, clasps, etc.).

The pivot member 240 is coupled to an external surface of the attachment member 230. In this manner, the attachment member 230 mechanically supports the pivot member when the orientation detection system 130 is coupled to the garment conveyor. The pivot member 240 is a mechanical device configured to pivot a pivot arm 250 about an axis (i.e., change the pivot state of the pivot arm 250). For example, the pivot member 240 may rotate about an axis when a garment hanger contacts a bumper 260 coupled to the pivot arm 250, which displaces the pivot arm 250 and causes the pivot member 240 to rotate about the axis. Alternatively stated, the pivot member 240 is movable between a "contact state" and a "no-contact state". To illustrate, a garment hanger in an incorrect orientation may contact the bumper 260, which displaces the pivot arm 250 and causes the pivot arm 250 to pivot the pivot member 240 to the contact state. On the other hand, a garment hanger in a correct orientation does not contact the bumper 260, which does not displace the pivot arm 250 and does not cause the pivot arm 250 to pivot the pivot member 240 to the no-contact state (or remain in the no-contact state).

In various embodiments, the pivot member 240 may be some other movable component able to determine whether a garment hanger is in an incorrect orientation. For example, the pivot member 240 may translate along an axis, rotate about an axis, move relative to another component, etc.

The pivot arm 250 is mechanically coupled to the pivot member 240 such that displacements of the pivot arm 250 cause the pivot arm 250 to rotate the pivot member 240 about an axis. The pivot arm 250 generally extends from the pivot member 240 towards the path 222. Similar to the pivot member 240, the pivot arm is moveable between a contact state and a no-contact state. In the no-contact state, the pivot arm 250 has not been deflected about the axis of the pivot member 240, and in the contact state the pivot arm 250 has been deflected about the axis of the pivot member 240.

In various embodiments, the pivot arm 250 may be some other component configured to assist in articulating the pivot member 240 between the contact state and noncontact state. That is, the pivot arm 250 may be any mechanical component that articulates the pivot member 240 from the contact state to no-contact state depending on the orientation of the garment hanger in the path. Whatever, the case, the pivot member 240 and pivot arm 250 are configured to articulate between (1) a contact state where the orientation detection system 130 (e.g., via the bumper 260) contacts a garment hanger in an incorrect orientation, and (2) a no-contact state where the orientation detection system 130 does not contact a garment hanger because it is in a correct orientation.

As described above, a bumper 260 is mechanically coupled to the end of the pivot arm 250. The bumper 260 is a mechanical object structured to extend into the path 222 of a garment hanger such that a garment hanger in an incorrect orientation contacts the bumper 260 and a garment hanger in a correct orientation does not contact the bumper 260. When a garment hanger in an incorrect orientation contacts the bumper 260, the pivot arm 250 is deflected and the pivot member 240 rotates. In other words, a garment hanger contacting the bumper articulates the pivot member 240 and/or the pivot arm 250 from the no-contact to contact state. Alternatively, a garment hanger in a correct orientation will not contact the bumper 260 and the pivot member 240 and/or pivot arm 250 will not deflect and remain in (or return to) the no-contact state. In some embodiments, a bumper 260 may not be included and the garment hangers may contact (or not contact) some other portion of the orientation detection system 130.

In some configurations, the bumper 260 may be include an adjustment member 280. The adjustment member 280 is a mechanically actuatable device that allows a user to move the location of the bumper 260 relative to the path 222. For instance, a user may actuate the adjustment member 280 to move the bumper into the path 222, out of the path 222, higher in the path 222, lower in the path 222, etc. Adjusting the position of the bumper 260 in the path 222 may increase (or decrease) the ability of the orientation detection system 130 to detect garment hangers in an incorrect orientation.

The orientation detection system 130 additionally includes a sensor 270. The sensor 270 is configured to determine the pivot state of orientation detection system 130. That is, the sensor 270 is configured to determine whether the orientation detection system 130 is in the no-contact state or the contact state. Depending on the configuration of the orientation detection system 130, the sensor 270 may determine the pivot state by measuring the pivot state of the pivot member 240 and/or the pivot arm 250. For instance, the sensor 270 may determine the pivot state by measuring the rotation of the pivot member 240, by measuring the deflection of the pivot arm 250, etc.

Typically, the sensor 270 is configured to generate an alert signal when the sensor 270 senses the contact state. For example, the sensor 270 may generate the alert signal when the pivot member rotates and/or when the pivot arm deflects. Generating the alert signal when the orientation detection system 130 is in the contact state indicates that a garment hanger is coupled to the rail 220 in an incorrect orientation. Alternatively, generating no alert signal when the orientation detection system 130 is in the no-contact state indicates that a garment hanger is coupled to the rail 220 in a correct orientation.

The sensor 270 can be any type of sensor 270 configured to measure the pivot state of the orientation detection system 130 and generate an alert signal. For instance, in a configuration, the sensor 270 may be a mechanical sensor 270 that generates a signal when the pivot member 240 and/or pivot arm 250 contacts the mechanical sensor 270 as it moves from the no-contact state to contact state (or vice versa). In another configuration, the sensor 270 may be a proximity sensor 270 that generates a signal when the pivot member 240 and/or pivot arm 250 moves sufficiently close (or far) from the sensor 270 when it moves from the no-contact to contact state. Of course, other sensors are also possible.

In some instances, the sensor 270 may be further configured to read an output from the sensor 270, interpret the sensor 270 output, and generate an alert signal in response. For instance, if the sensor 270 is mechanical, the sensor 270 may measure any of force, pressure, duration, etc. as an output of the sensor 270. In this case, if the sensor 270 measures, for example, a mechanical force for greater than a threshold amount of time, the sensor 270 will generate an alert signal indicating that the pivot member 240 and/or pivot arm 250 is in an incorrect orientation. Other types of sensors 270 with other sensor outputs can function similarly. For example, if the sensor 270 is proximity based, the sensor 270 can determine that, for example, a time signal of a proximity measurement (e.g., time-series information describing the distance between the pivot arm 250 and the sensor 270) reflects that the pivot member 240 and/or pivot arm 250 moves from the no-contact state to the contact state and can generate the appropriate alert signal in response.

The sensor 270 also includes a notification system. The notification system is electrically coupled to the sensor and is configured to transmit the alert signal within the garment marketplace 100. For instance, the sensor 270 may transmit the alert signal to an operator of the garment marketplace 100, the garment processing system 110, the garment conveyor, the garment intake system 120, etc. In some cases, the garment processing system 110 may automatically take actions when receiving the alert signal. For example, the garment processing system 110 may actuate the rail 220 to stop or slow garment hangers in the garment marketplace 100. Operators may then change the orientation of the garment hanger in an incorrect orientation to the correct orientation. Once the garment hanger is placed in the correct orientation, the operator may reengage the garment conveyor to continue moving garment hangers through the garment marketplace 100. Remedying the orientation of garment hangers in the incorrect orientation prevents those garment hangers from causing detrimental technical faults in the garment marketplace 100.

Additionally, the sensor 270 (or some other sensor attached to the garment identification system 130 or garment conveyor) may be used to identify a garment hanger. For example, the sensor 270 may capture an image of the garment hanger and identify the garment based on a garment identifier on the garment hanger (e.g., a Q.R. code). The garment identifier may also be associated with any metadata for a garment hanging from the identified garment hanger. Thus, the alert signal can include information that assists an operator in identifying garment hangers that are in an incorrect orientation. For example, the alert signal may include a location of the garment hanger, the type of clothing hanging from the garment hanger, or some other identifying information for the garment hanger.

Figure 3A:
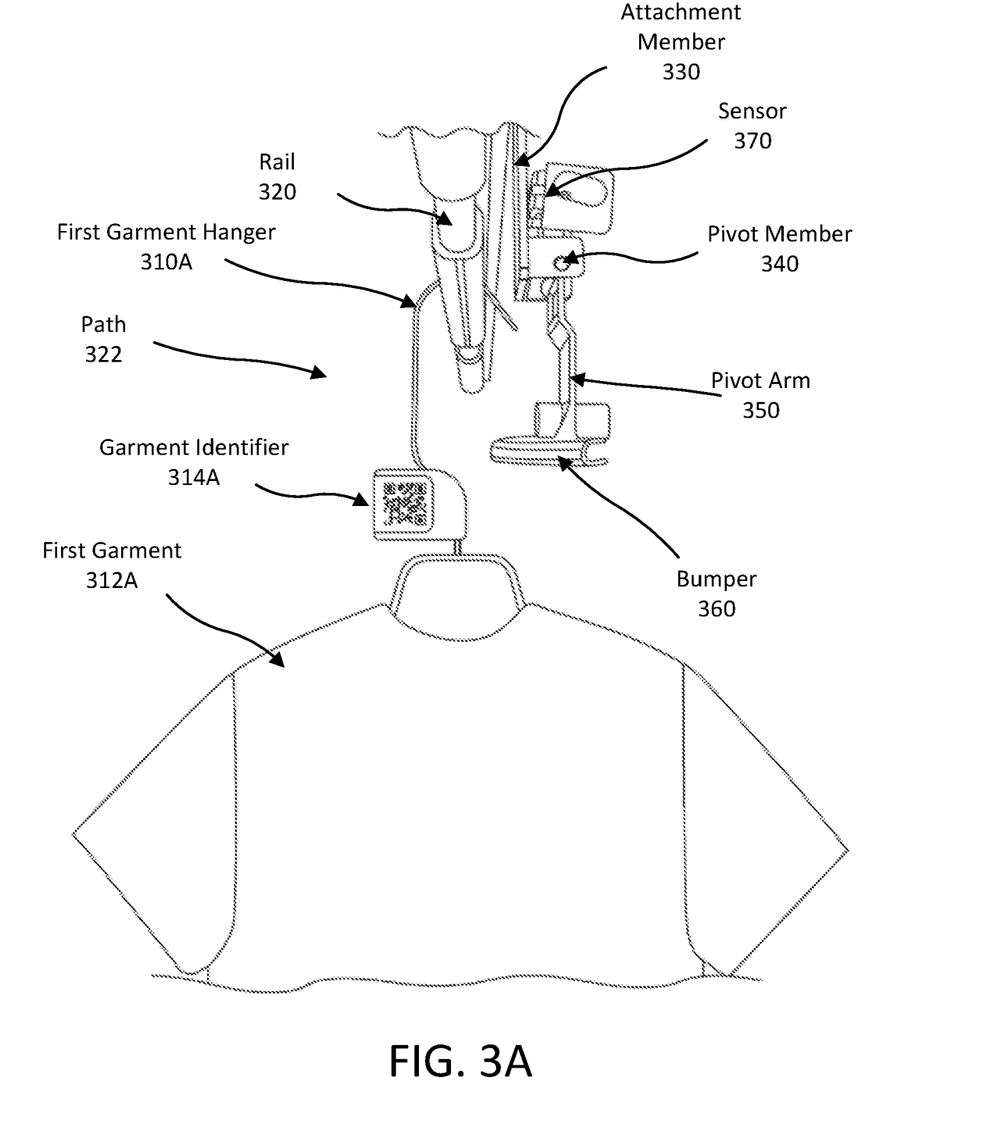
FIG. 3A illustrates the pivot state of the orientation detection system when a garment hanger is in a correct orientation, according to one example embodiment.
Figure 3B:
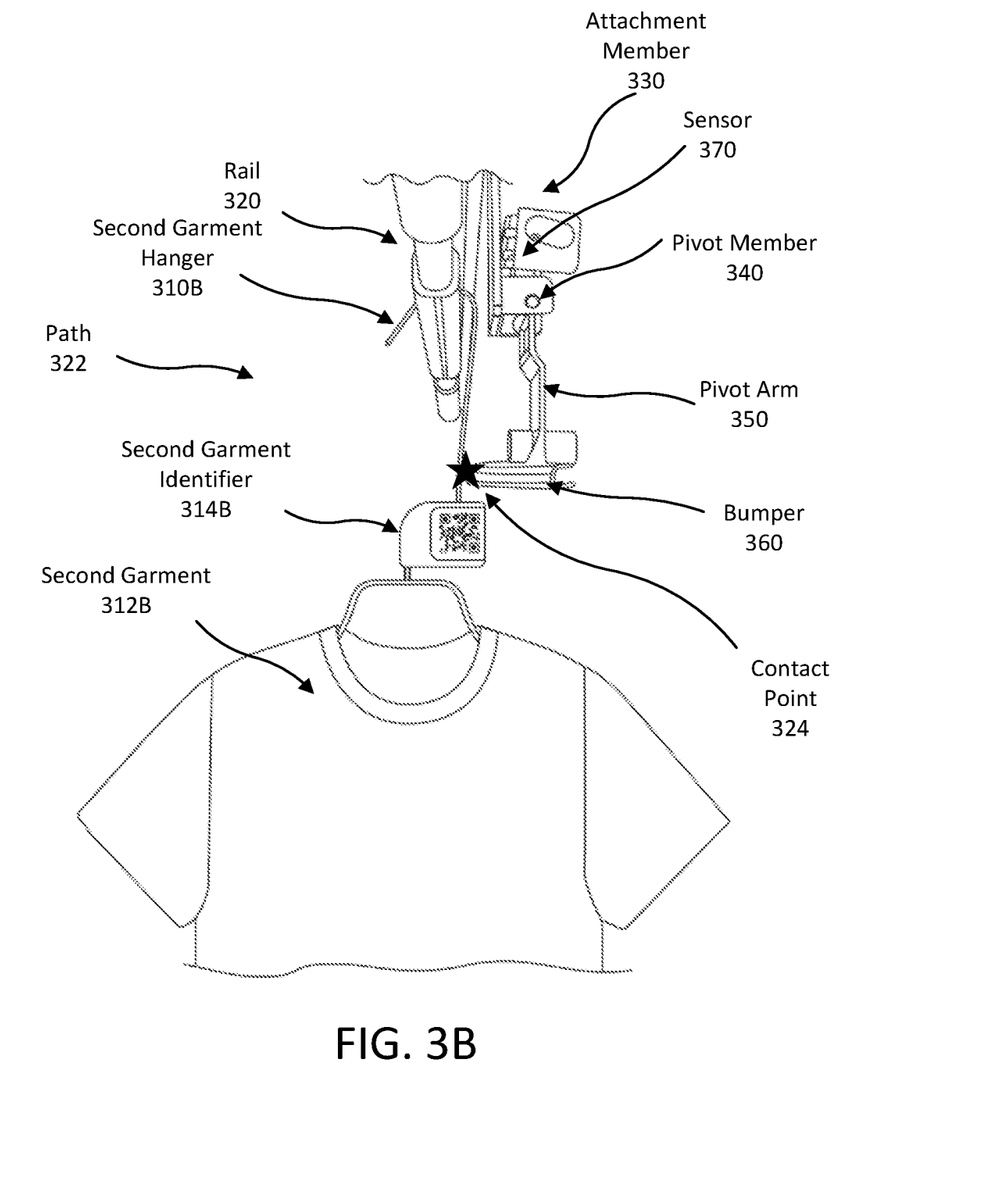
FIG. 3B illustrates the pivot state of the orientation detection system when a garment hanger is in an incorrect orientation, according to one example embodiment.

To illustrate the differences in the pivot state, the description turns to FIGS. 3A and 3B. FIG. 3A illustrates the pivot state of the orientation detection system when a garment hanger is in a correct orientation, according to one example embodiment. FIG. 3B illustrates the pivot state of the orientation detection system when a garment hanger is in an incorrect orientation, according to one example embodiment. The orientation detection system 130 and garment conveyor illustrated in FIGS. 3A and 3B are substantially similar to the orientation detection system 130 illustrated and garment conveyor in FIGS. 2A and 2B. In FIGS. 3A and 3B, however, garment hangers are in the path 322 of the garment conveyor such that the orientation detection system 130 can determine the orientation of the garment hanger.

In FIG. 3A, an orientation detection system 130 is attached to a garment conveyor. A first garment hanger 310A conveying a first garment 312A through the garment marketplace 110 is removably coupled to the rail 320 in a correct orientation. A garment hanger 310 is in a correct orientation when the garment hanger 310 (e.g., first garment hanger 310A) is coupled to the rail 320 such the garment hanger 310 does not contact the bumper 360 as it travels along the path 322. As illustrated, the first garment hanger 310A in a correct orientation because the open edge of the first garment hanger 310A faces the bumper 360 of the orientation detection system 130. In other words, the "C" shape of the first garment hanger 310A is oriented such that the open side of the "C" is nearer the bumper 360 than the closed side of the "C" shape.

Because the first garment hanger 310A is in the correct orientation, the garment conveyor conveys the first garment hanger 310A past the orientation detection system 130 without contacting the bumper 360. That is, the open edge of the "C" shape passes the bumper 360 without contacting the bumper and deflecting the pivot arm 350. Because the pivot arm 350 does not pivot the pivot member 340 about an axis, the sensor 370 does not sense the contact state. Because the sensor 370 does not sense the contact state (i.e., the first garment hanger 310A is in an incorrect orientation), the garment identification system 130 does not generate an alert signal and continues conveying the first garment 312A through the garment marketplace 100. The first garment identifier 314A may be used to track the location of the first garment hanger 310A and the first garment 312A in the garment marketplace 100.

In FIG. 3B, a second garment hanger 310B conveying a second garment 312B through the garment marketplace 100 is removably coupled to the rail 320 in an incorrect orientation. A garment hanger 310 is in an incorrect orientation when the garment hanger 310 (e.g., second garment hanger 310B) is coupled to the rail 320 such the garment hanger 310 contacts the bumper 360 (e.g., at contact point 324 as it travels along the path 322). As illustrated, the second garment hanger 310B is in a correct orientation because the second garment hanger 310B is coupled to the rail 320 such the second garment hanger 310B contacts the bumper 360 as it travels along the path 222. The second garment hanger 310B in an incorrect orientation because the closed edge of the second garment hanger 310B faces the bumper 360 of the orientation detection system 130. In other words, the "C" shape of the second garment hanger 310B is oriented such that the closed side of the "C" is nearer the bumper 360 than the open side of the "C" shape.

Because the second garment hanger 310B is in the incorrect orientation (rather than the correct orientation), as the garment conveyor conveys the garment hanger past the orientation detection system 130 the second garment hanger 310B contacts the bumper 360. That is, the closed edge of the "C" shape contacts the bumper 360 as it passes the orientation detection system 130. When the second garment hanger 310B contacts the bumper 360, the pivot arm 350 deflects about an axis of the pivot member 340. In response, the sensor 370 senses the change from no-contact state to the contact state. Because the sensor senses the contact state, the orientation detection system 130 determines the garment hanger is in an incorrect orientation and transmits an alert signal to the garment processing system 110. The alert signal causes the garment processing system to stop conveying the second garment hanger 310B through the garment marketplace 100. The alert signal includes the second garment identifier 314B on the second garment hanger 310B to assist an operator in identifying the second garment hanger 310B when correct its orientation.

It is understood that different configurations of garment hangers 310 can lead to variations as to correct or incorrect orientation. Whatever the configuration of garment hanger 310, the orientation detection system 130 is configured to determine an orientation of a garment hanger 310 by sensing a pivot of the pivot arm 350 and/or pivot member 340 with the sensor 370.

II.A Example Orientation Detection

Figure 4A:
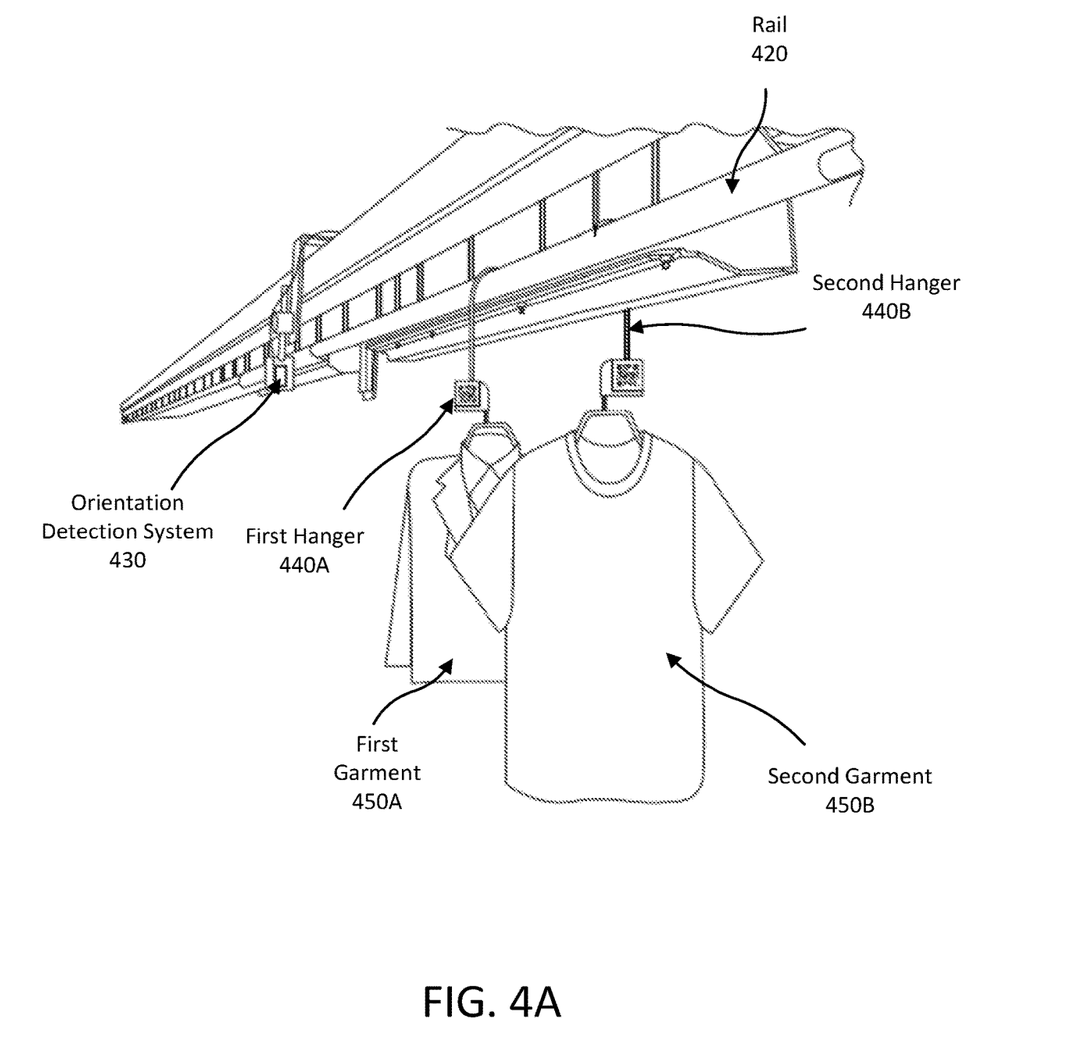
FIGS. 4A-4C illustrate detection of an incorrect orientation for a garment hanger, according to one example embodiment.
Figure 4B:
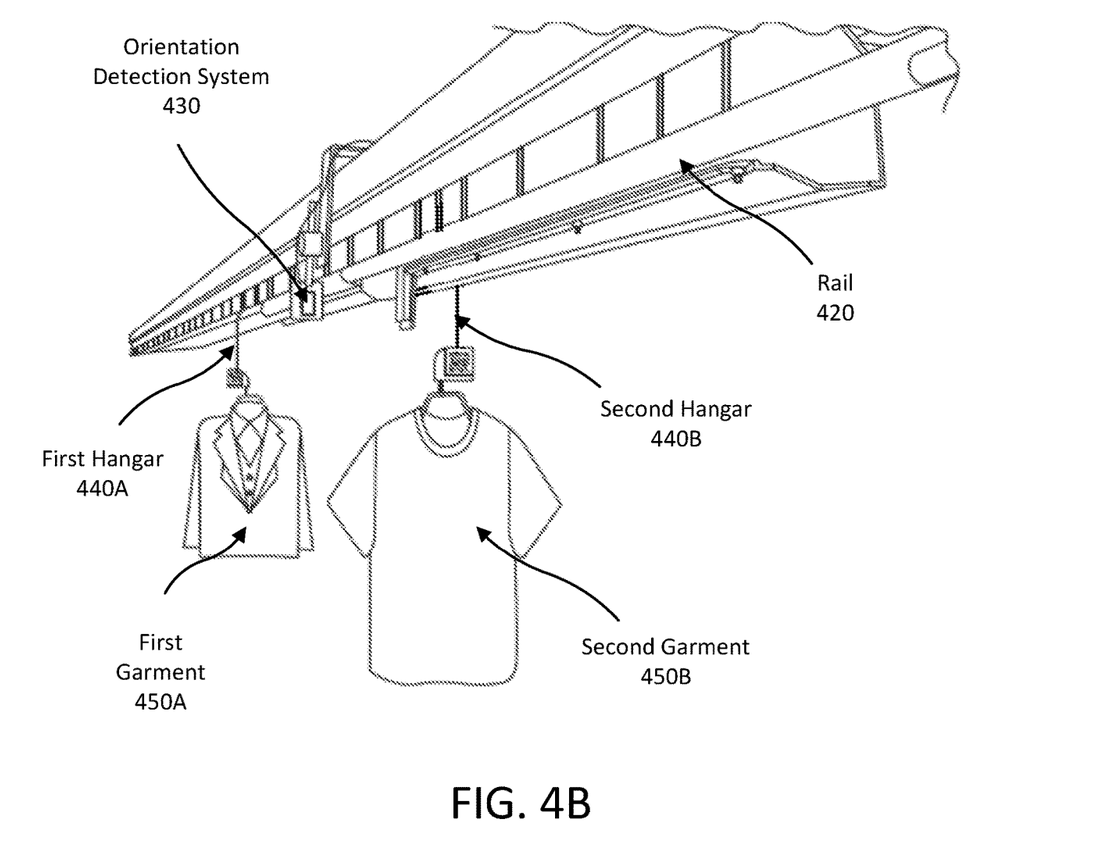
Figure 4C:
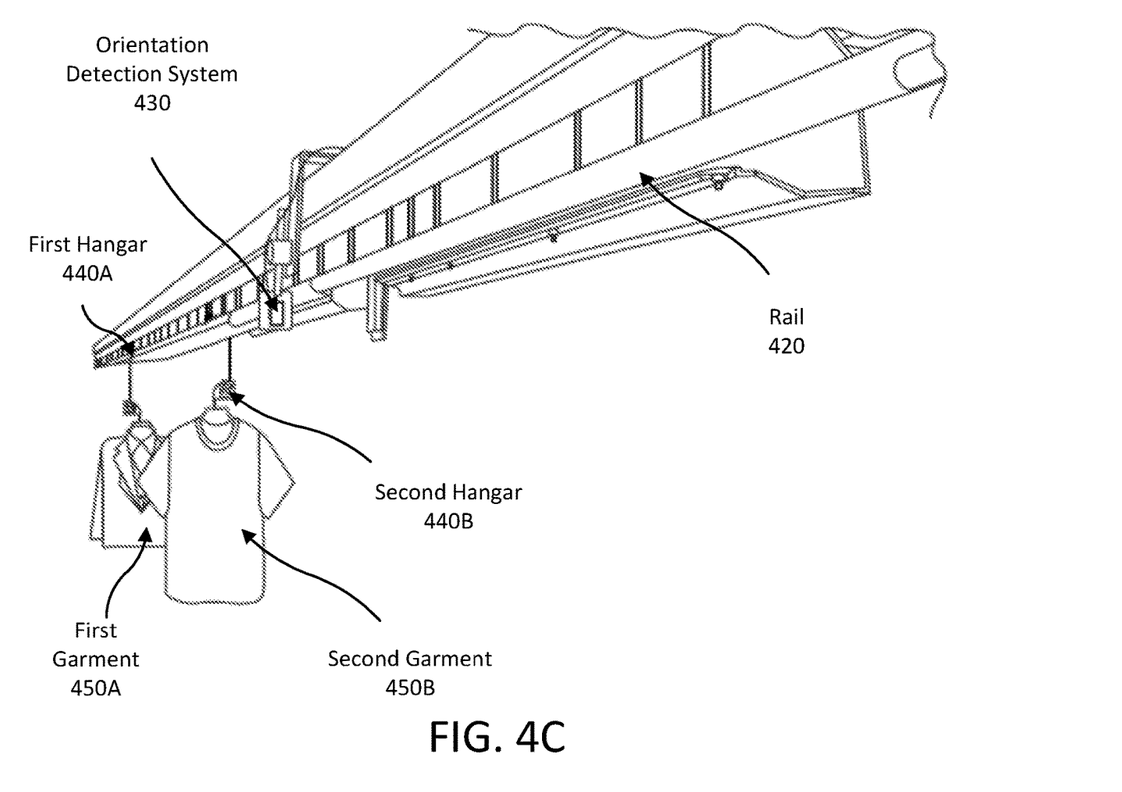

FIGS. 4A-4C illustrate detection of an incorrect orientation for a garment hanger, according to one example embodiment. FIGS. 4A-4C illustrate a rail 420, an orientation detection system 430, a first garment 450A, a second garment 450B, a first garment hanger 440A, and a second garment hanger 440B.

The garment conveyor moves garments within the garment marketplace 100. To do so, as described in greater detail above, the garment conveyor includes an actuatable rail. The rail 420 is structured such that garment hangers are removably couplable to the rail 420. The garment conveyor actuates the rail 420 to move the rail 420 through the garment marketplace 100 and the garment hangers 440 correspondingly move through the garment marketplace 100. Because garments 450 may be attached to garment hangers 440, when the garment conveyor moves the garment hangers 440 any garment affixed to those garment hangers move correspondingly.

The orientation detection system 430 detects an orientation of garment hangers moving through the garment marketplace 100. To do so, the orientation detection system 430 is positioned in the path such that garment hangers 440 in the correct orientation do not change the pivot state of the orientation detection system 430, while garment hangers in the incorrect orientation change the pivot state of the orientation detection system 430.

The orientation detection system 430 continuously monitors the pivot state. Thus, when a sensor of the orientation detection system 130 senses a change in the pivot state (e.g., deflection of the pivotable detection arm and/or the pivot member), the orientation detection system 430 can output an alert signal indicating the orientation of the garment hanger 440 is incorrect. Conversely, when a sensor of the orientation detection system 430 does not sense a change in the pivot state (e.g., no deflection pivotable detection arm and/or pivot member), the orientation detection system 430 does not output an alert signal (thereby indicating the orientation of the garment hanger 440 is a correct orientation). In cases such as this, the garment conveyor may continue to move the garment hangers through the garment marketplace 100 (e.g., towards a garment identification system 140 and/or a garment store 160).

To expand, as illustrated, the garment conveyor is moving a first garment 450A and a second garment 450B from a first location to a second location. The first garment 450A is hanging on a first garment hanger 440A and the second garment 450B is hanging on the second garment hanger 440B. The first garment hanger 440A is in a correct orientation and the second garment hanger 440B is in an incorrect orientation.

FIG. 4A illustrates a first moment in time as the garment conveyor is moving the first garment 450A and second garment 450B through the garment marketplace 100. The first garment hanger 440A is at a first location on the path, and the second garment hanger 440B is at a second location on the path. The first location is further along the path than the second location. At this first point in time, neither the first garment hanger 440A nor the second garment hanger 440B has moved past the orientation detection system 430 along the path.

FIG. 4B illustrates a second moment in time as the garment conveyor moves the first garment 450A and second garment 450B through the garment marketplace 100. The second moment in time is after the first moment in time. The first garment hanger 440A is at a third location on the path and the second garment hanger 440B is on a fourth location on the path. The third location is further along the path than the first, second, and fourth location. The fourth location is further along the path than the first and second location.

At this second point in time the first garment hanger 440A has moved past the orientation detection system 430, while the second garment hanger 440B has not moved past the orientation detection system 430. Because the first garment hanger 440A is in the correct orientation, the pivot state of the orientation detection system 430 does not change as the first garment hanger 440A travels past the orientation detection system 430 on the path. Accordingly, the orientation detection system 430 does not sense a change in the pivot state and does not create an alert signal indicating the first garment hanger 440A is in an incorrect position. As the second garment hanger 440B has not moved past the orientation detection system 430, it does not generate an alert signal.

FIG. 4C illustrates a third moment in time as the garment conveyor moves the first garment 450A and the second garment 450B through the garment marketplace 100. The third moment in time is after both the first moment in time and second moment in time. The first garment hanger 440A is at a fifth location on the path and the second garment hanger 440B is on a sixth location on the path. The fifth location is further along the path than the first, second, third, fourth, and sixth locations. The sixth location is further along the path than the first, second, third, and fourth locations.

At this third point in time, the second garment 450B has moved past the orientation detection system 430. Because the second garment hanger 440B is in the incorrect orientation, the pivot state of the orientation detection system 430 changes as the second garment hanger 440 travels past the orientation detection system 430 on the path. Accordingly, the orientation detection system 430 senses a change in the pivot state and creates an alert signal indicating the second garment hanger 440B is in an incorrect position.

II.B Implementing Orientation Detection

Figure 5:
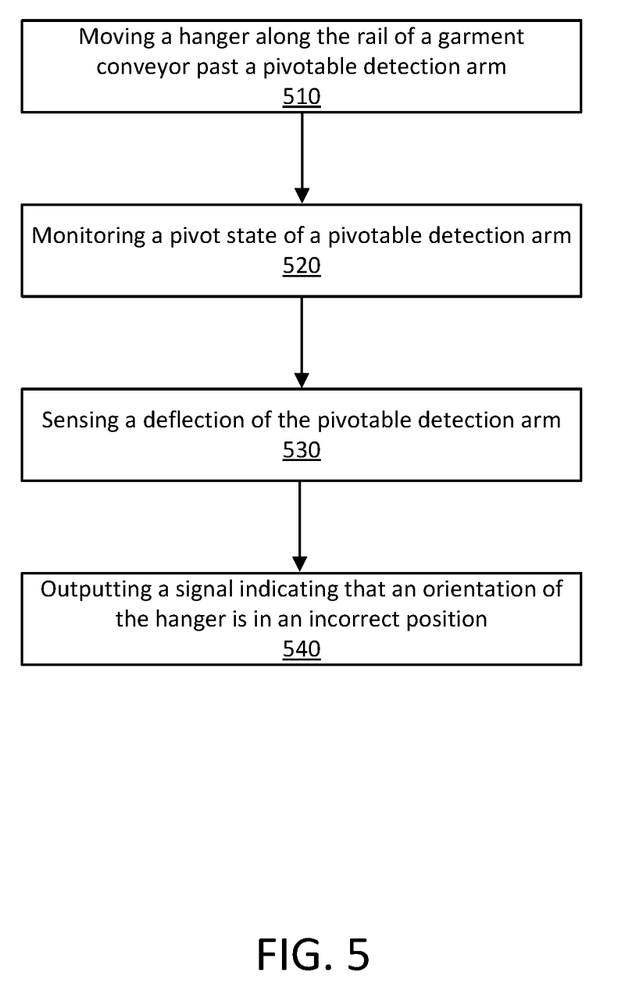
FIG. 5 is a workflow diagram for a method to determine an incorrect orientation of a garment hanger using an orientation detection system, according to one example embodiment.

FIG. 5 is a workflow diagram for a method to determine an incorrect orientation of a garment hanger using an orientation detection system, according to one example embodiment. In various embodiments, method 500 can include additional or fewer steps or the steps may be accomplished in other orders. Moreover, in various embodiments, method 500 can repeat any of the steps, or any series of steps, at any time.

A garment conveyor in moving a garment hanger from a first location to a second location along a rail. A garment is affixed to the garment hanger such that it moves from the first location to the second location as the garment hanger moves along the rail. An orientation detection system including a pivotable detection arm is attached to the garment conveyor. The pivotable detection arm is positioned in the path (e.g., via a bumper) between the first location and the second location.

The garment conveyor moves 510 the garment hanger along the rail and the orientation detection system continuously monitors 520 the pivot state of the pivotable detection arm as the garment hanger moves.

The garment hanger moves past the pivotable detection arm as it travels from the first location to the second location. Because the garment hanger is in an incorrect orientation, the garment hanger contacts the pivotable detection arm and causes the pivotable detection arm to pivot. A sensor of the orientation detection system senses 530 the deflection of the pivotable detection arm. In response to sensing that the pivot state of the pivotable detection arm has changed, the orientation detection system outputs an alert signal indicating the orientation of the garment hanger on the rail is in an incorrect orientation.

III. Additional Considerations

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for determining an orientation of a hanger on a rail of a garment conveyor, the method comprising:
    moving the hanger along the rail of by the garment conveyor past a pivotable detection arm coupled to the rail;
    monitoring, by a control unit, a pivot state of the pivotable detection arm;
    sensing, using the control unit, a deflection of the pivotable detection arm when the pivot state of the pivotable detection arm changes; and
    responsive to sensing a change in the pivot state of the pivotable detection arm and using the control unit, outputting a signal indicating that the orientation of the hanger on the rail is in an incorrect orientation.

2. The method of claim 1, further comprising responsive to receiving the signal, transmitting a notification to an operator of the garment conveyor that the orientation of the hanger on the rail is the incorrect orientation.

3. The method of claim 1, wherein sensing the deflection of the pivotable detection arm further comprises:
measuring a pressure of a portion of the pivoting detection arm against a pressure sensor; and
wherein the measured pressure indicated whether the orientation of the hanger is in the incorrect orientation.

4. The method of claim 1, wherein sensing the deflection of the pivotable detection arm further comprises:
measuring a distance between a portion of the pivotable detection arm and a sensor of a proximity sensor; and
wherein the measured distances indicates whether the orientation of the hanger is in the incorrect orientation.

5. The method of claim 1, further comprising terminating the movement of the hanger along the rail of the garment conveyor when the outputted signal indicates that the orientation of the hanger on the rail in in the incorrect orientation.

6. The method of claim 5, further comprising adjusting the incorrect orientation of the hanger on the rail to a correct orientation of the hanger on the rail.

7. The method of claim 6, further comprising restarting the garment conveyor such that the hanger moves along the rail of the garment conveyor.

8. The method of claim 1, wherein the hanger comprises an identification marker and the garment conveyor is configured to identify which hanger is in the incorrect orientation based on the identification marker.

9. The method of claim 1, further comprising:
responsive to sensing no deflection of the pivotable detection arm; and
moving the hanger along a rail to a garment identification system.

10. A hanger orientation detection system comprising:
an attachment member coupled to a rail of a garment conveyor;
a pivot arm coupled to the attachment member and pivotable between a no-contact pivot state and a contact pivot state:
a sensor coupled to pivot arm and configured to determine:
the pivot arm is positioned in the no-contact pivot state when hangers hanging in a correct orientation on the rail of the garment conveyor translate past the pivot arm without contacting the pivot arm, and
the pivot arm is positioned in the contact pivot state when hangers hanging in an incorrect orientation on the rail of the garment conveyor translate past the pivot arm and contact the pivot arm;
a notification system electrically coupled to the sensor and configured to transmit a notification to the garment conveyor when the sensor determines a hanger is in the incorrect position.

11. The hanger orientation detection system of claim 10, wherein the pivot arm comprises a bumper coupled to an end of the pivot arm positioned furthest from the attachment member and wherein the bumper is positioned such that it extends into a translation path of the rail system.

12. The hanger orientation detection system of claim 11, wherein the bumper contacts the hanger in the contact pivot state and does not contact the hanger in the no-contact pivot state.

13. The hanger orientation detection system of claim 10, wherein:
the hanger comprises a c-shaped section,
the hanger is in the incorrect orientation on the rail when a long edge of the c-shaped section is adjacent to the pivot arm, and
the hanger is in the correction orientation on the rail when a long edge of the c-shaped section is opposite the pivot arm.

14. The hanger orientation detection system of claim 10, wherein the sensor is a mechanical pressure sensor.

15. The hanger orientation system of claim 14, wherein the mechanical pressure sensor generates an electrical signal indicating the sensed orientation and transmits the electrical signal to the notification system.

16. The hanger orientation system of claim 10, further comprising a hanger identification system configured to identify the hanger on the garment conveyor.

17. The hanger orientation system of claim 10, wherein the rail of the garment conveyor is coupled to a garment identification system and the garment conveyor moves the hanger to the garment identification system in response to sensing the pivot arm is in the no-contact state.

18. The hanger orientation detection system of claim 10, wherein the sensor is a proximity sensor.

19. The hanger orientation system of claim 15, wherein the proximity sensor generates an electrical signal indicating the sensed orientation and transmits the electrical signal to the notification system.

20. A non-transitory computer readable storage medium storing computer program instructions for determining an orientation of a hanger on a rail of a garment conveyor, the computer program instructions, when executed by one or more processors, cause the one or more processors to:
move the hanger along the rail by the garment conveyor past a pivotable detection arm coupled to the rail;
monitor, with a control unit, a pivot state of the pivotable detection arm;
receive, at the control unit, a signal indicating a sensed deflection of the pivotable detection arm when the pivot state of the pivotable detection arm changes; and
responsive to sensing a change in the pivot state of the pivotable detection arm and using the control unit, output a signal indicating that the orientation of the hanger on the rail is in an incorrect orientation.

21. The non-transitory computer readable storage medium of claim 20, wherein the computer program instructions, when executed by the one or more processors, further cause the one or more processors to:
terminate the movement of the hanger along the rail of the garment conveyor when the outputted signal indicates that the orientation of the hanger on the rail in in the incorrect orientation.

* * * * *